United States Patent [19]

Deissenberger

[11] Patent Number: 4,538,775
[45] Date of Patent: Sep. 3, 1985

[54] APPARATUS FOR THE SPINDLELESS MOUNTING, AS WELL AS THE CUTTING AND CUTTING TO LENGTH AND SIMULTANEOUS MEASUREMENT OF SPOOLS

[76] Inventor: Hans Deissenberger, Bildechingen, 7240 Horb, Fed. Rep. of Germany

[21] Appl. No.: 414,538

[22] Filed: Sep. 3, 1982

[30] Foreign Application Priority Data

Sep. 3, 1981 [DE] Fed. Rep. of Germany ....... 3134824

[51] Int. Cl.³ .................... F16D 51/16; B60T 13/04; B65H 75/30
[52] U.S. Cl. ................ 242/129.51; 242/99; 242/129.8; 188/75
[58] Field of Search ............ 242/54 R, 75.46, 129.51, 242/129.8, 75.4, 86.7, 99, 156, 129.6, 156.2; 188/75; 384/310

[56] References Cited

U.S. PATENT DOCUMENTS

| 981,950 | 1/1911 | Ryden | 242/54 R |
|---|---|---|---|
| 1,013,588 | 1/1912 | Cowgill | 242/80 |
| 1,895,217 | 1/1933 | VanVorst | 242/129.6 |
| 2,647,699 | 8/1953 | Bush | 242/54 R |
| 3,894,617 | 7/1975 | Wiecko | 242/75.4 X |
| 3,917,365 | 11/1975 | Jenness | 384/310 |
| 4,151,900 | 5/1979 | Kirwan | 242/75.46 X |
| 4,353,515 | 10/1982 | Weaver et al. | 242/99 X |

Primary Examiner—Stuart S. Levy
Assistant Examiner—Lloyd D. Doigan
Attorney, Agent, or Firm—William A. Drucker

[57] ABSTRACT

The invention comprises a frame having open bearings for removably receiving the spindle of a reel therein. Each of the bearings is mounted for vertical movements to control the operation of a brake for automatically regulating the braking force against the reel or spool as a function of the weight thereof. The construction is such that the reels or spools can be easily replaced without disassembling the apparatus.

11 Claims, 16 Drawing Figures

APPARATUS FOR THE SPINDLELESS MOUNTING, AS WELL AS THE CUTTING AND CUTTING TO LENGTH AND SIMULTANEOUS MEASUREMENT OF SPOOLS

BACKGROUND OF THE INVENTION

The invention relates to an apparatus according to the preamble. An apparatus for storing and selling products wound in roll form is already known in which the unwinding article sets in motion two measuring means having measuring wheels. The spool bearings are connected by articulations or joints to the frame in order to permit a simple insertion of the new reels by tilting the arms carrying the reels. The reel bearings are screwed to a cover, which must be dismantled for changing purposes. Thus, both manipulation and the known apparatus are very complicated. (German Pat. No. 152 087).

If the winding product, such as cables or lines, is supplied without a spool and is placed on to a spool for further processing, it is also conventional practice to apply the wound article with a vertical spindle or axis and to adapt the core diameter to the internal diameter of the reel. For this purpose an auxiliary flange is provided with a multiply wound spiral guide common to all the blocks and on the outer edge of the spool flange is provided a device for adjusting the auxiliary flange comprising a gear mounted in rotary manner on the spool flange and which engages with a gear rim in the vicinity of the outer edge of the auxiliary flange. However, this device is also complicated and costly if fitted to the support frame of an apparatus of the aforementioned type used for carrying a plurality of such spools (German Pat. No. 1 254 425).

Pivot bearings for more than two interchangeable spools with a common rotation axis are also often provided with partly axially displaceable pivot pins for the spools. One pivot pin is constructed as an axially non-displaceable hollow pin, whilst the other pivot pin is axially displaceable in the hollow pin. However, this construction is also complicated and does not permit the replacement of the parts by those having different dimensions (German Pat. No. 1 264 203).

Finally devices for removing electrical line portions are known (DOS No. 21 19 926).

The further prior art discloses a brake for preventing the lagging of the winding article. However, this is separate from the aforementioned device for winding up such articles and both devices are complicated and require a large amount of space. In certain constructional embodiments the brake can be manually adjusted, but only by means of a constant brake pressure. Resetting is complicated and imprecise.

The aforementioned measuring devices also have the disadvantage that the wound article unwound from the spool is not precisely guided between the measuring reel and the guide. As a result of the lateral, superimposed spool mounting there is a different entry angle and the different thickness of the wound article leads to erroneous measurements because the article does not continuously rotate the measuring wheel. There is even a risk that the wound article will be completely free of the action of the measuring wheel and will slide out of the guide. The complete measuring process is then incorrect and must be repeated. In addition, as a result of wear grooves of the wound article appear in the cable guide. It is then no longer possible to cut to length smaller article diameters or alternatively imprecise measurements are obtained. Furthermore handling and manipulation are very difficult. The measuring wheel must be raised with one hand, whilst the other must be used for inserting the article into the guide beneath the measuring wheel, which often leads to time losses and to imprecise insertion. Imprecise results are also obtained as a result of the different shapes of the materials, e.g. flat or round cables.

BRIEF SUMMARY OF THE INVENTION

The problem of the invention is to provide an apparatus of the aforementioned type permitting an easier handling with a simple and space-saving construction. It is intended inter alia to permit the replacement of the spools by spools having different axial lengths and diameters, whilst permitting the reuse of the reels. It is also intended that the packing and stacking of the reels be facilitated for the purpose of sending back.

According to another partial problem a brake is to be integrated, which not only has a much simpler construction, but inter alia also makes it possible to regulate the braking force automatically as a function of the spool weight and using the simplest means.

Finally the aforementioned meter is to be improved in such a way that the aforementioned disadvantages are eliminated.

For the solution of the aforementioned problem the characterizing features of claim 1 are provided. This makes it possible in the simplest possible way to replace the spools in that they are firstly formed into easily disassemblable reels and can then be very easily inserted because the bearings are open at the top. It is then merely necessary to insert the short sharp ends from above into the said bearings and without any assembly being necessary. It is just as easy to remove and disassemble the reels and then the components thereof can be easily packed and returned. In a manner surprising to the Expert this makes it possible to move away in economic manner from the otherwise conventional practice of disposal after a single use, because the preferably plastic components can be very easily fitted and can be dispatched with limited expenditure.

As a result of the characterizing features of claim 1 the aforementioned problem is solved during the braking of the reels, whilst simultaneously considerably reducing expenditure.

The aforementioned partial problem in connection with the measuring device is solved by the characterizing features of claim 21.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
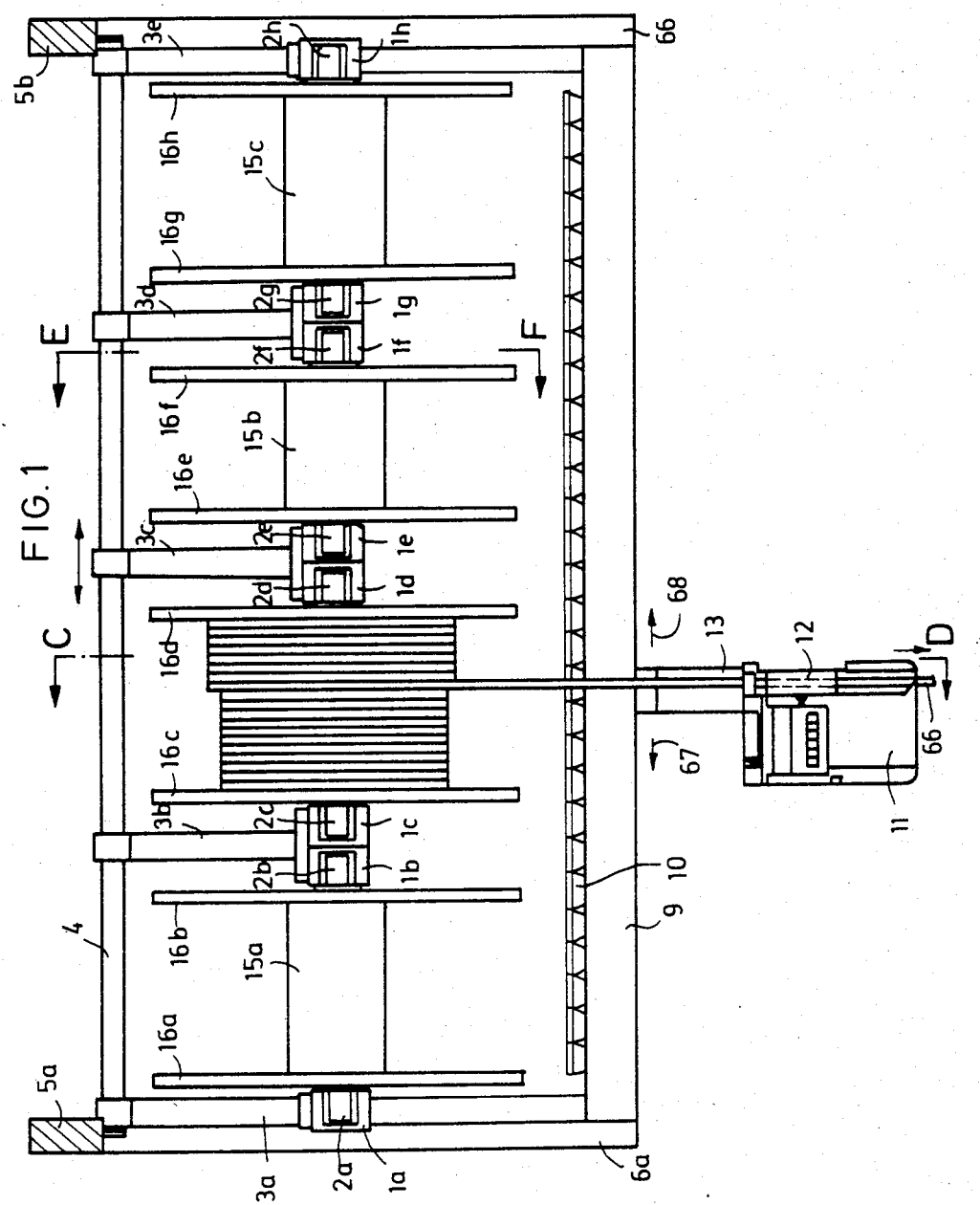
FIG. 1 a plan view in sectional form along line A—B of FIG. 2.

At the top of FIG. 1 it is possible to see in section the two vertical supports 5a and 5b. To the latter is fitted the horizontal crossbar 4, carrying the horizontal arms 3a, 3b, 3c, 3d and 3e, to whose ends are fixed the spindle bearings 1a, 1b, 1c, 1d, 1e, 1f, 1g and 1h, which are open at the top making it possible to see the reel spindles 2a to 2h in this plan view.

All the reels are the same. To both the left and right they have an outer disk 16 and in the centre a reel cylinder 15 with the aforementioned short spindles 2. A winding article 66 is applied to the second reel from the left, a line being supplied nthrough a cable guidance bush 10 of cable guidance rail 9 via mounting support 13 of the length measuring machine 11 and is passed through the latter. The cable guidance rail 9 can be moved together with the aforementioned cable guidance bush 10 in the direction of arrows 67 and 68. In the same way mounting support 13 is laterally displaceable.

The details will be explained by means of the remaining drawings.

Figure 2:
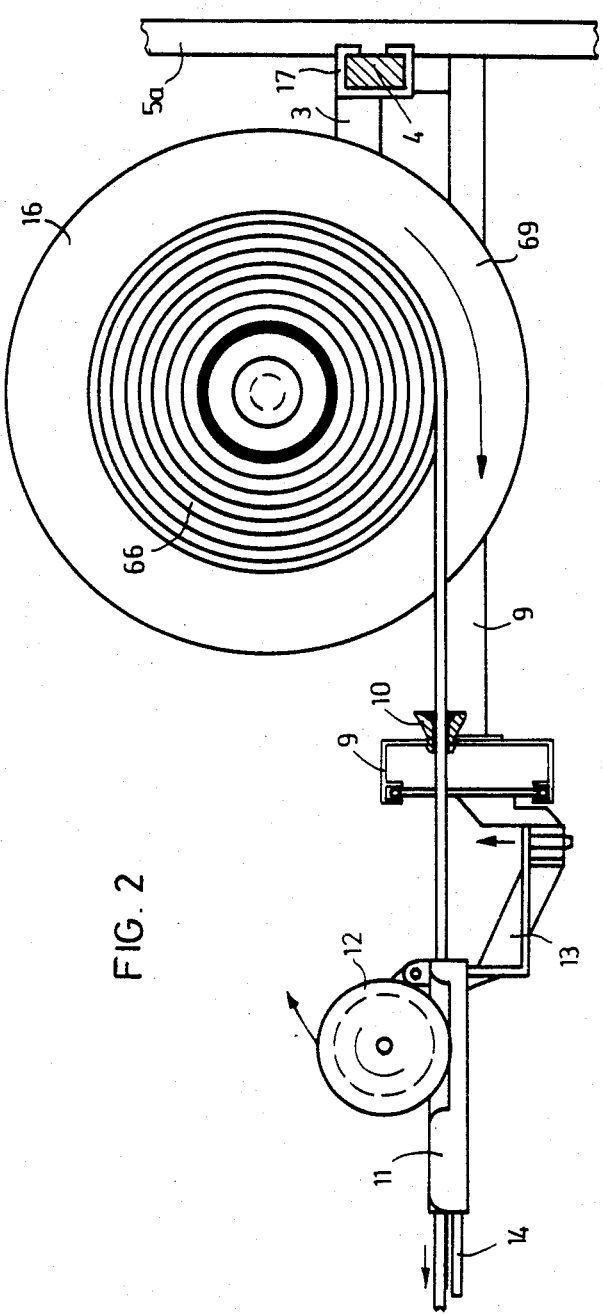
FIG. 2 a section along line C—D of FIG. 1.

FIG. 2 initially shows how arms 3 are fixed to the crossbars. For this purpose the crossbars have an angular cross-section and are embraced by a corresponding square ring, which is welded to arm 3. Preferably it is not a complete ring 17 and is instead interrupted or constructed in U-shaped manner. Ring 17, together with arms 3 and the bearings 1 fixed to the front thereof can be easily moved on crossbar 4, so that it is possible to easily receive reels having different axial lengths.

Further to the left it can be seen that the wound article 66 is moved in the direction of arrow 69 through the sectionally represented cable guidance bush 10 into the length measuring machine 11 under the measuring wheel. A cutting mechanism 14 is connected in the passage direction behind the length measuring machine 11.

Figure 3:
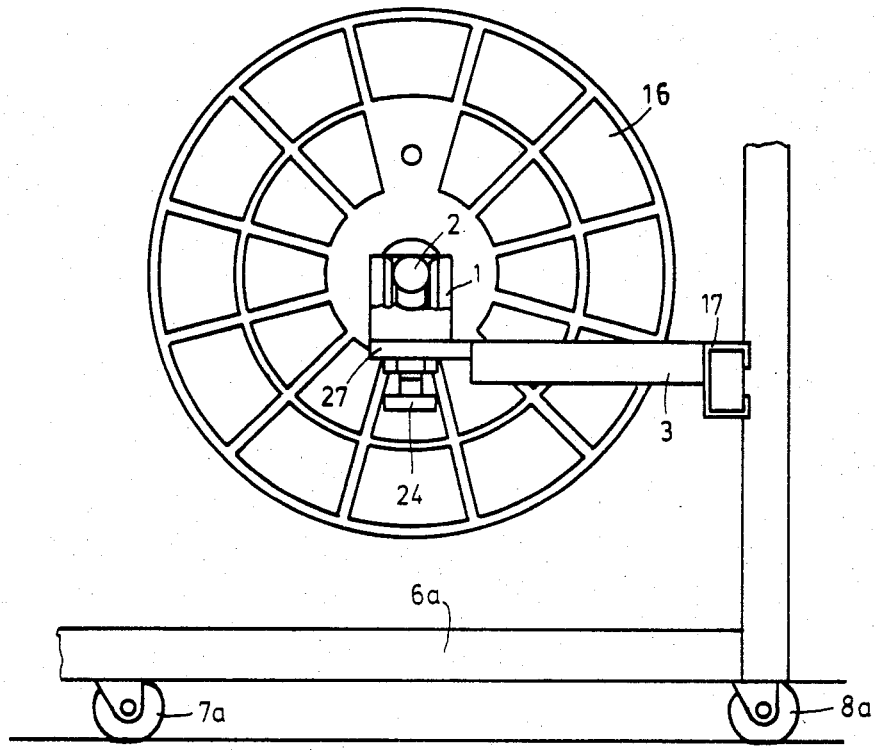
FIG. 3 a section along line E—F of FIG. 1.

FIG. 3 clearly shows that bearing 1 is open at the top, so that the spindle or shaft ends 2 can be easily inserted from above. The details will be explained hereinafter.

At the bottom the supporting frame has a horizontal support 6a on which there is a roller 7 at the bottom. The aforementioned vertical support 5a is supported at the bottom by a further roller 8a. Thus, the complete supporting frame rests on four rollers, the two rear rollers not being visible here. FIG. 1 also shows the further horizontal supports 6b under which is located roller 7b, whilst roller 8b is positioned in a not visible manner below the vertical support 5b.

Figure 4:
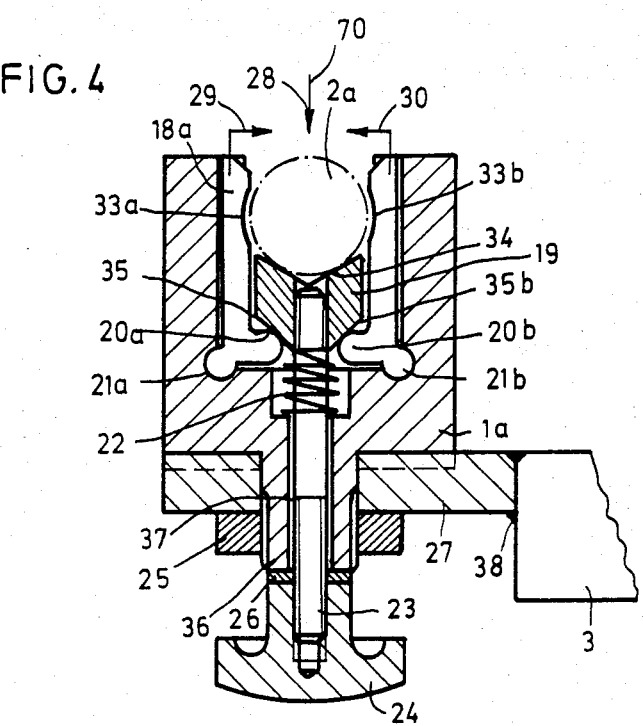
FIG. 4 a vertical section through the spool bearings according to the preceding drawings.

FIG. 4 shows a section through the reel bearing according to the invention with the integrated brake.

To the left and right of bearing 1a is provided a laterally guided brake shoe lever 18a, 18b having brake shoes 33a, 33b which, through their shaping, also exercise a lateral guidance function.

Spindle 2a here rests on seat 19 having at the top a prismatic mounting 34 for the spindle and at the bottom two inclined faces 35a, 35b for resting on the bearing points 20a, 20b of the aforementioned brake levers 18. With reference to the centre axis 70 to the two levers 18 have externally located pivot bearings 21a, 21b located in corresponding recesses of bearing 1a.

A stud bolt 23 is screwed into the seat 19 and further down into the bearing 1a and a spigot 36 is loosely arranged in a guide 37. A star knob 24 for the manual manipulation of the stud bolt 23 is provided at the lower end of the latter. A washer 26 is positioned between the star knob and the spigot 36. Spigot 36 is screwed by means of a nut 25 on to receiving plate 27, which is welded at 38 to arm 3. A compression spring 22 is mounted between seat 19 and bearing 1.

The operation of the bearing-brake combination according to the invention is explained hereinafter. As soon as spindle end 2a is inserted from above into the bearing, the corresponding proportional weight of the reel with the wound article presses on to seat 19. However, up to a certain weight seat 19 is held in this position by spring 22. Only on exceeding a certain reel weight does spring 22 give way, so that by means of its inclined faces 35a, 35b seat 19 at bearing points 20a, 20b forces levers 18a, 18b downwards in the direction of arrow 28. As a result of the external rotary movable mounting support 21a, 21b the levers are pressed inwards in the direction of arrows 29, 30 on to spindle 2a, so that brake shoes 33a, 33b engage and now exert their braking action in the spindle as a function of the weight. As the cable unwinds, the total reel weight constantly decreases so that the braking force is reduced until it finally disappears. This ensures an automatic adaptation of the braking force to the weight without any special regulating device being required. The braking force is also automatically regulated without any action from the outside and always adapts to the weight of the reel and the wound article, so that no jerky braking action occurs. Thus, the invention provides an optimum true-running braking action. However, it is also possible to adjust the braking force manually. By tightening the star knob 24 the seat 19 can be pressed downwards on to levers 18, which also leads to a braking action.

This bearing-brake combination can naturally also be used with other devices where similar problems have to be solved.

Figure 5:
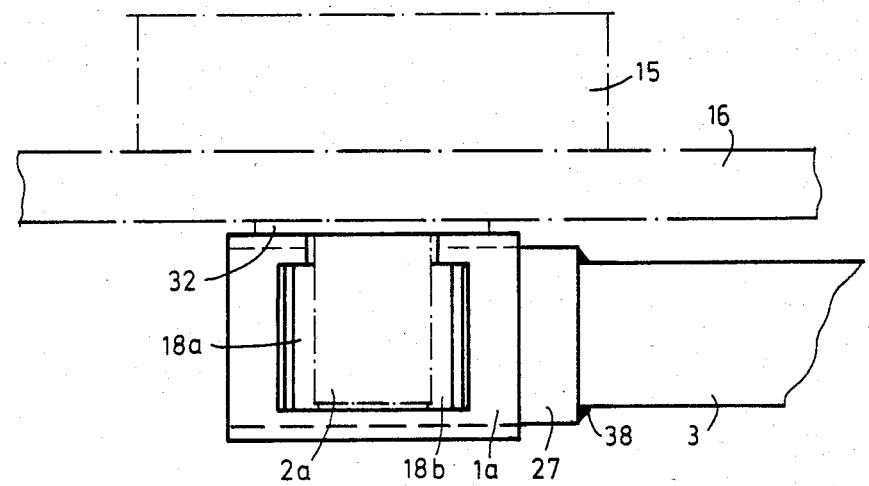
FIG. 5 a plan view of the detail of FIG. 4.

FIG. 5 shows that the spool or reel is provided with a lateral limiting flange 32, which externally engages on bearing 1a. In addition, the possibility exists of spindle 2a frontally engaging with bearing 1a, as can be gathered from FIG. 5.

Figure 6:
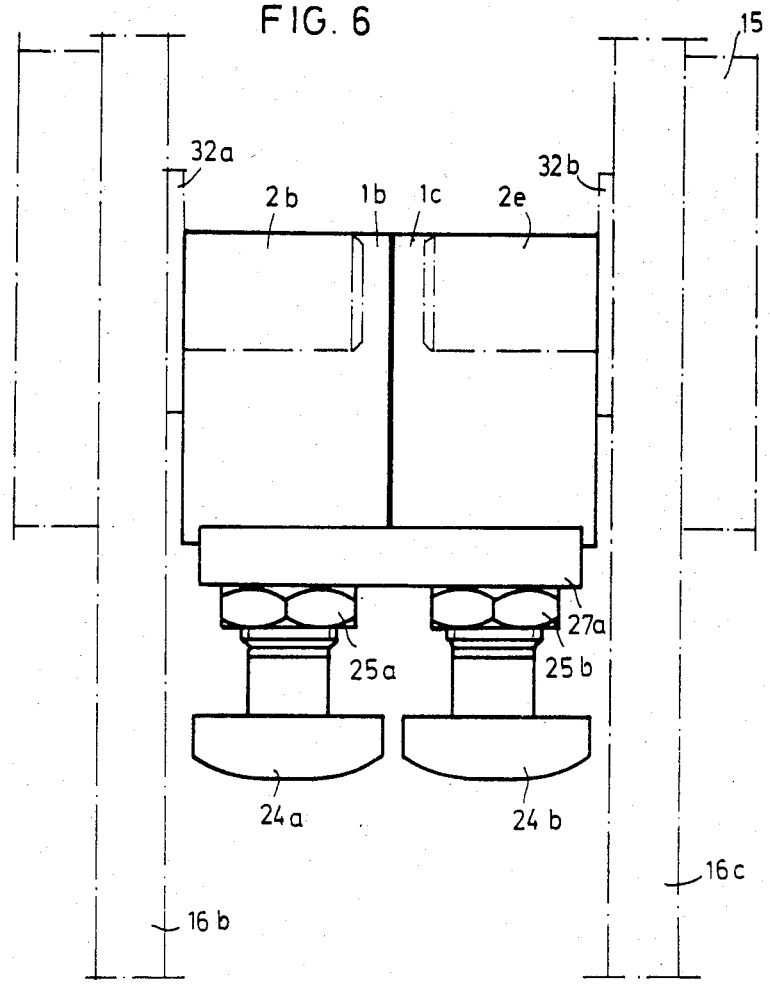
FIG. 6 a side view of the detail of FIG. 4 with a double bearing.

FIG. 6 shows a double mounting support of the two juxtaposed spindle ends 2b, 2c, the two bearings 1b, 1c having a common receiving plate 27a. Otherwise there are no changes with FIGS. 4 and 5 and the same bearings are involved.

Considerable space and material savings are obtained, as can be gathered from FIGS. 4 to 6.

The complete apparatus, together with the receiving plate 27, can always be easily fitted, even on devices of other types, so that the bearing-brake combination according to the invention is not restricted to the presently described use. Therefore independent protection is claimed for claim 11.

Figure 7:
FIG. 7 a side view of one of the spools as a section along line C—D of FIG. 1.
Figure 8:
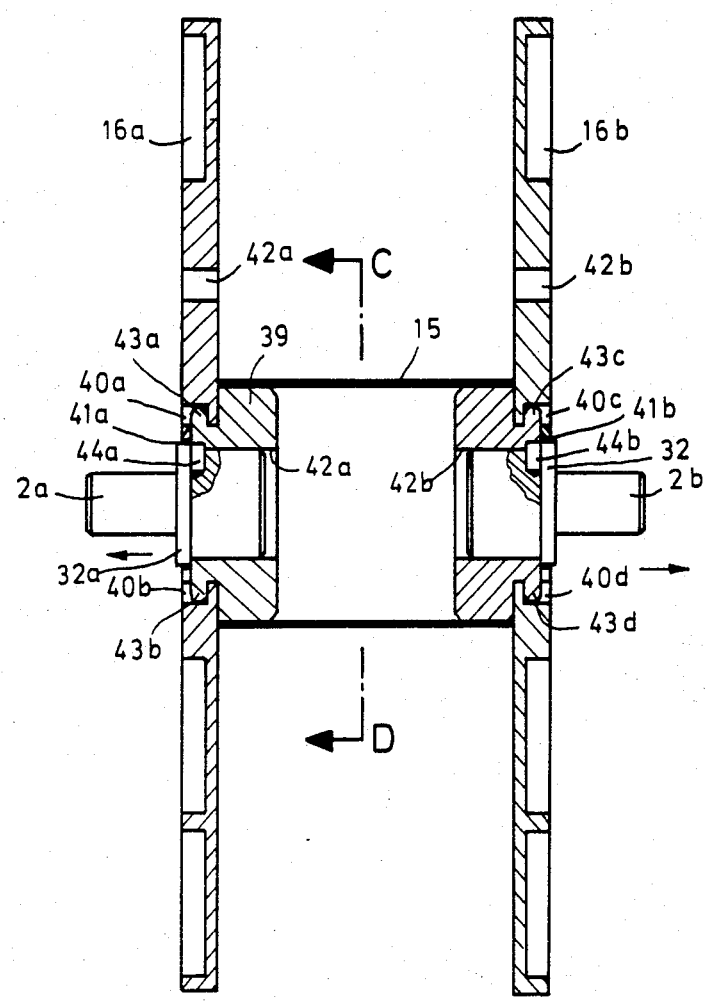
FIG. 8 a section along line A—B of FIG. 7.
Figure 9:
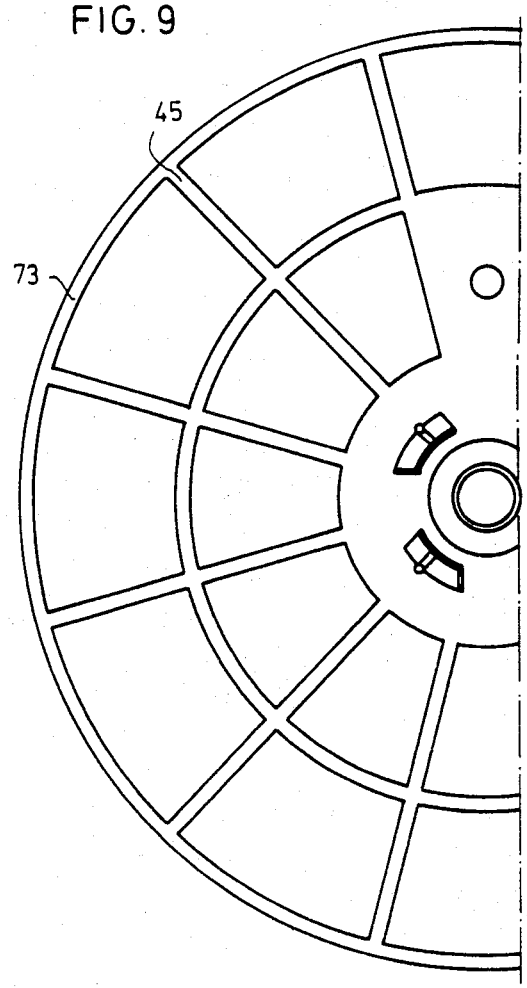
FIG. 9 a partial front view of the other side of the reel compared with FIG. 7.
Figure 10:
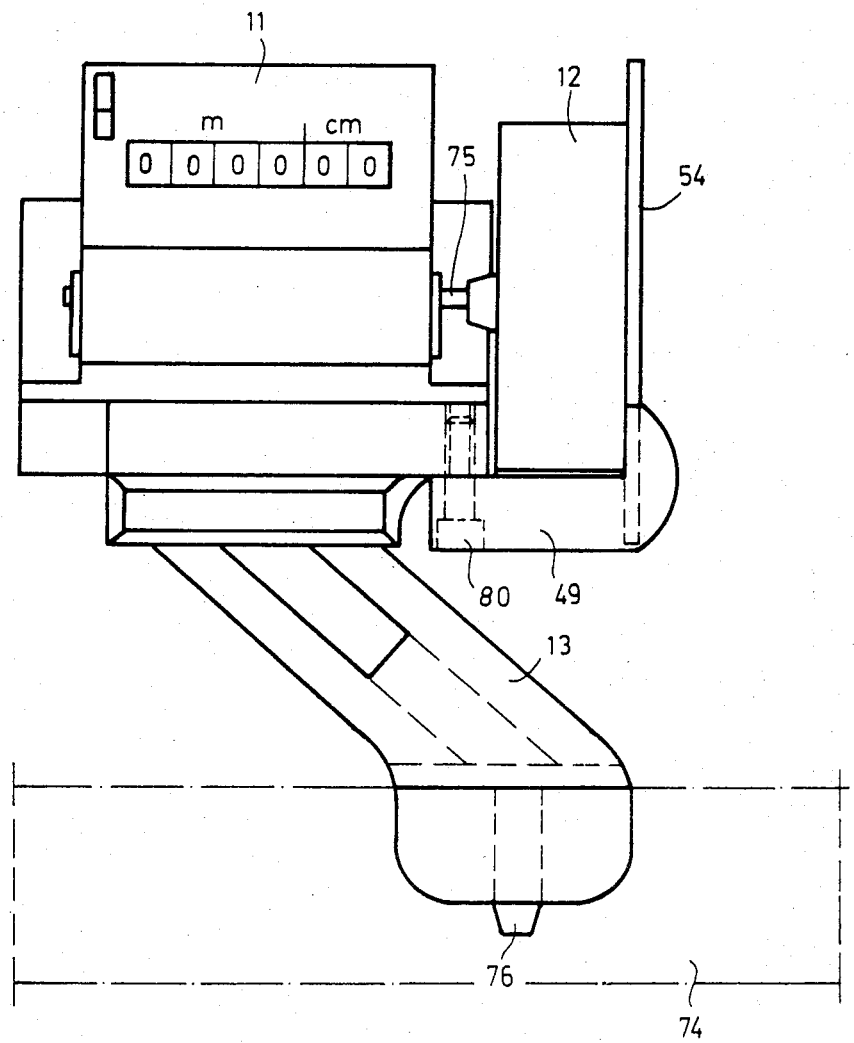
FIG. 10 a view from the front of part of FIG. 1.

FIGS. 7 to 9 show the disassemblable reel according to the invention. The outer disk 16a is provided with a bayonet catch 46 in order to be able to rapidly connect the disk to the reel or spool cylinder 15. As bayonet catches are known per se, there is no need to describe them in detail. As a result of rotation to the left or right in the direction of arrows 71, 72, the outer disk can be easily individually separated from cylinder 15. The two plastic outer disks 16a, 16b always have the same diameter, whereas both the diameter and the length of spool cylinder 15, which can be considered as the winding core, can be chosen in accordance with individual requirements. The disks have parallel base faces, so that it is possible to stack several disks, thereby facilitating dispatch. The bayonet catch is integrated into the thickness of the disk (cf. FIG. 8) and its shape and dimensions remain unchanged in order to permit easy interchangeability of different reel or spool cylinders. For winding-on purposes there are central bores 41a, 41b for the start of the winding article and a bore 47a, 47b for a tappet. The core bores 41, 42 in the disk and the connecting piece 39 also permit the insertion of spindle 2a, 2b, whose dimensions can be chosen as a function of individual requirements.

The parts of the bayonet catch 43a, 43b, 43c, 43of the reel cylinder are chosen as a function of the recesses 40 in the disk and are always the same. The external diameter of connecting piece 39 is modified to adapt to different diameters of cylinder 15.

The spindle ends 2a, 2b are also provided with lateral limiting flanges 32a, 32b and driving pins 44a, 44b, so that the spindles always reliably rotate with the connecting piece 39 and transfer the braking forces to the entire reel.

As can be gathered from FIG. 8 the connecting pieces 39 are welded to the reel cylinders and therefore form a unit with the latter. If the diameter a and/or the length l of the reel is to be changed, other completely welded units are used.

FIG. 9 shows that the outer face of the plastic outer disks is provided with radial reinforcing ribs 45 and peripherally located reinforcing ribs 73, which leads to a material saving.

The reels of the type according to the invention can be used for other random purposes, so that independent protection is claimed for claim 18.

As the reel cylinders 5c can be chosen independently of the outer disks 16, it is possible to wind articles of the most varied type on to the said reel.

FIGS. 10 to 16 show the length measuring machine and the fitting there of. At the bottom of FIG. 10 the dash-dotted lines indicated the receiving plate 74, which is also shown in sectional form in FIG. 2. Mounting support 13 is inserted in a corresponding bore of the said plate by means of locking pin 76. To the top of the mounting support is fitted cable guide 49, to which is fitted to the left the length measuring machine with matter 11 and to which is fitted to the right the length measuring wheel 12 connected by shaft 75 to meter 11. Such machines are well known to the Expert and need not therefore be described in detail here.

Figure 11:
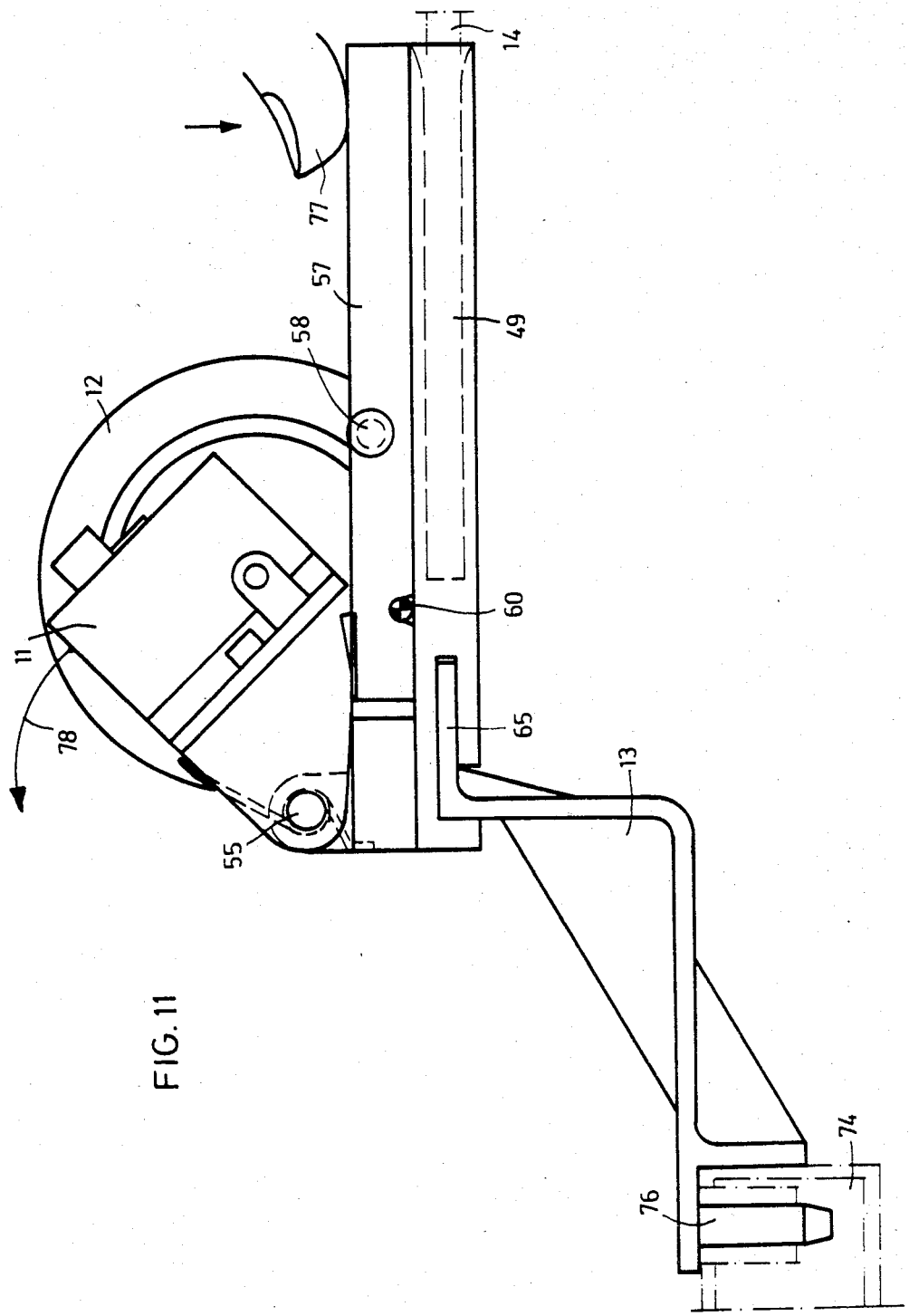
FIG. 11 a side view of the detail of FIG. 10.
Figure 13:
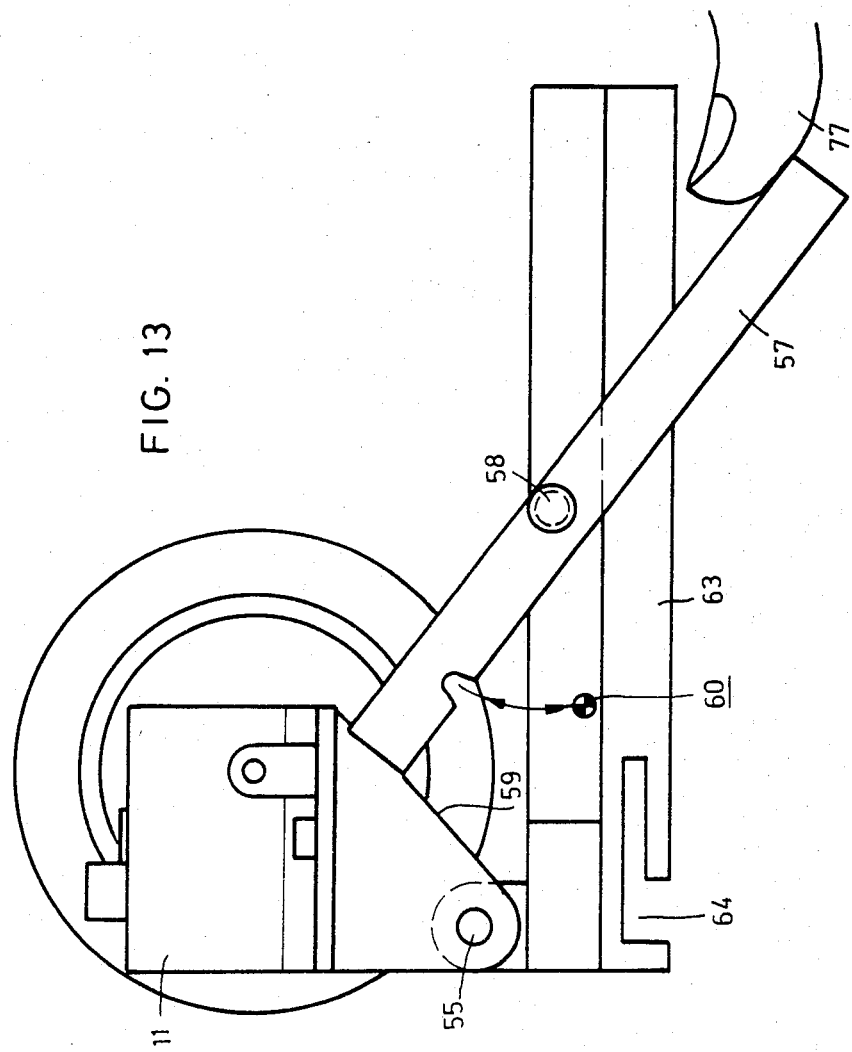
FIG. 13 a view as in FIG. 11, but in a different working position.

The side view of FIG. 11 shows that the mounting support 13 has an insertion part 65 at the top, which is inserted in a corresponding recess of cable guide 49. This permits easy disassembly. Further to the right the cutting mechanism 14 is indicated by broken lines. Above the cable guide is mounted a release lever 57 so as to move around pivot 58, whilst at the right-hand side it is also possible to see the finger 77 of an operator for pressing lever 57 downwards. At the left-hand end of lever 57 there is a stop pin 60, which engages in a corresponding recess 57, as can be seen in FIG. 13. Further to the left it is possible to see pivot pin 55 about which the length measuring machine is pivoted in the direction of arrow 78 when lever 57 is pressed downwards by finger 77. The pivoted position is shown in FIG. 13.

Figure 12:
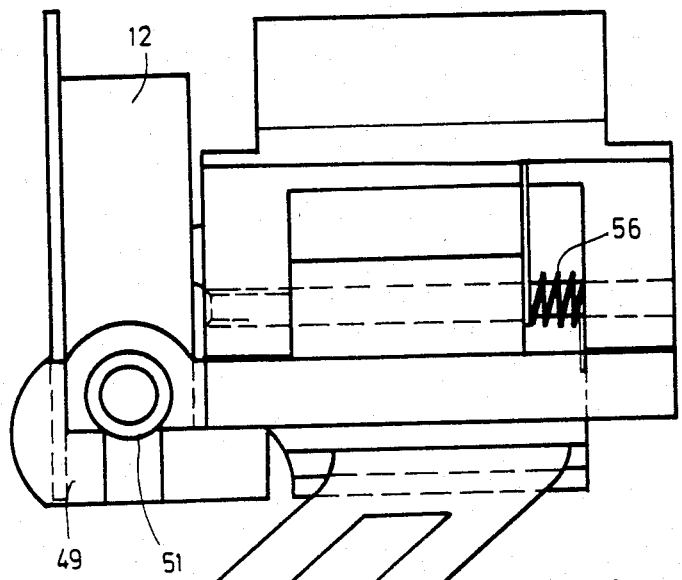
FIG. 12 a view from the rear of the detail of FIG. 10.

FIG. 12 also shows a torsion spring 56, which is arranged around the aforementioned pivot pin 55, so that unit 11 is constantly resiliently held in its inoperative position, shown in FIG. 11.

When pressure is now exerted by finger 77, lever 57 is pivoted upwards at this point and slides at its opposite end on an inclined face 59 of the length measuring machine until the raised position shown in FIG. 13 is reached. Lever 57 is self-locking in this position, because it can no longer slide back. This is due to the fact that lever 57 here acts as a support for unit 11, which is under spring tension, inclined face 59 being approximately at a right angle to lever 57. The lever must be operated from below if the measuring machine is to be returned to the position of FIG. 11.

FIG. 13 shows base plate 63 without insertion part 65, so that it is only possible to see the corresponding recess 64 for said part.

Figure 14:
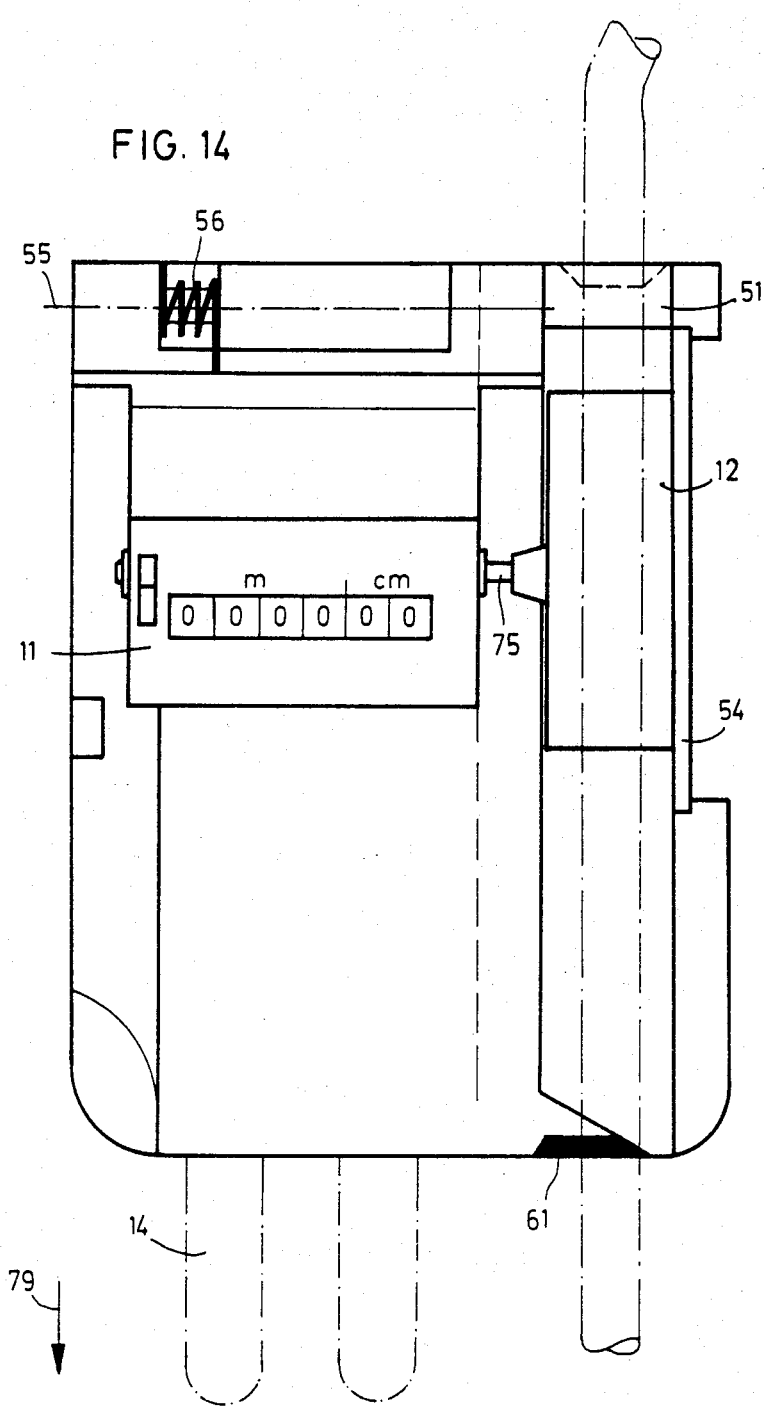
FIG. 14 a plan view of the detail of FIG. 10.

As a result of the self-locking action in the position according to FIG. 13, the operator has both hands available for the effortless insertion of the winding article and specifically up to mark 61 in FIG. 14.

It can also be gathered from FIG. 14 that inlet nozzle 51 is positioned just in front of the engagement point between the guide and the measuring wheel 12. As a result the wound article is detected by measuring wheel 12 immediately on leaving nozzle 51. The circumference of the wheel is roughened in order to increase the friction coefficients between the wheel and the article.

The measuring wheel is provided with a lateral flange 54, which serves as an additional lateral guide for the wound article. The dash-dotted lines and arrow 79 at the bottom of FIG. 14 indicate that the cutting mechanism 14 can be removed in this direction. Therefore it is always handy.

Figure 15:
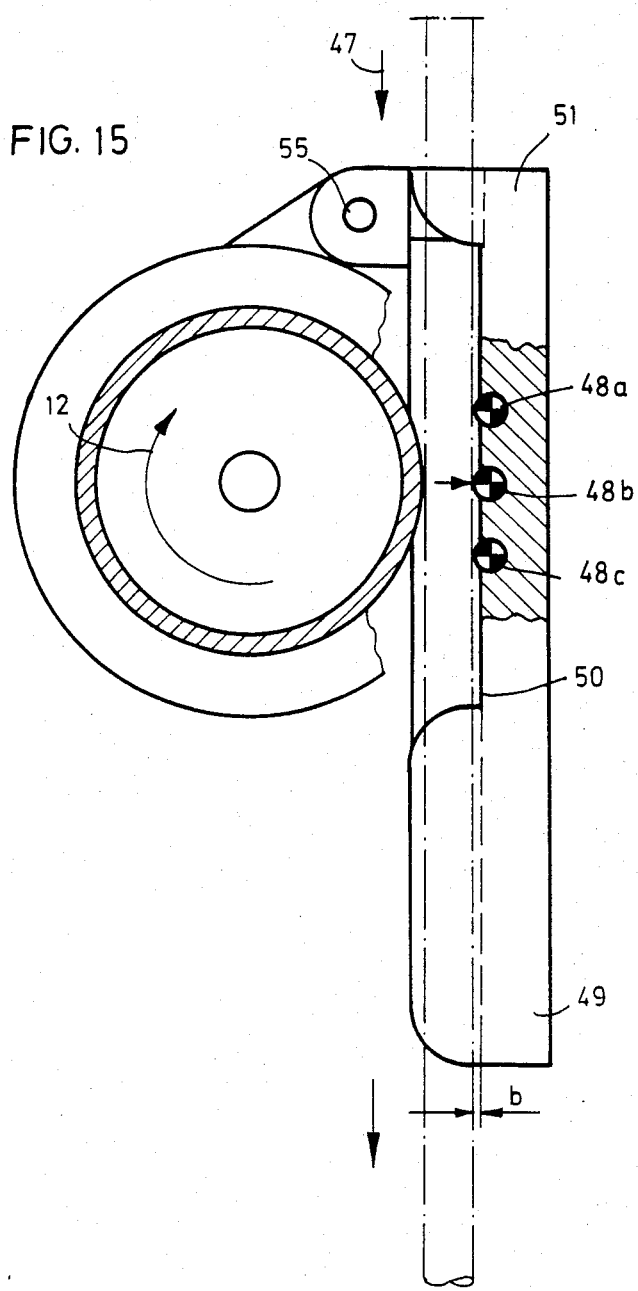
FIG. 15 a part sectional side view of the embodiment of FIG. 14.

FIG. 15 particularly shows that three hardened steel pins 48a, 48b, 48c are incorporated into cable guide 51 and over which the wound article can be drawn in sliding manner, thereby preventing premature wear to the cable guide surface. As a result of the limited frictional resistance due to the point support between the wound article and the pins, there is an optimum drive from measuring wheel 12 through the wound article to be pulled through. The dimensions of cable guide 49 are precisely adapted to the measuring device, but by loosening and detaching screws 80 according to FIG. 10 it can be easily replaced by a differently shaped guide. This leads to the advantage that for different wound articles a correspondingly shaped guide can be used, whilst still employing the same measuring device.

The surface of pins 48 is above the base surface by dimension b, the latter preferably being 0.5 to 1.5 mm.

Figure 16:
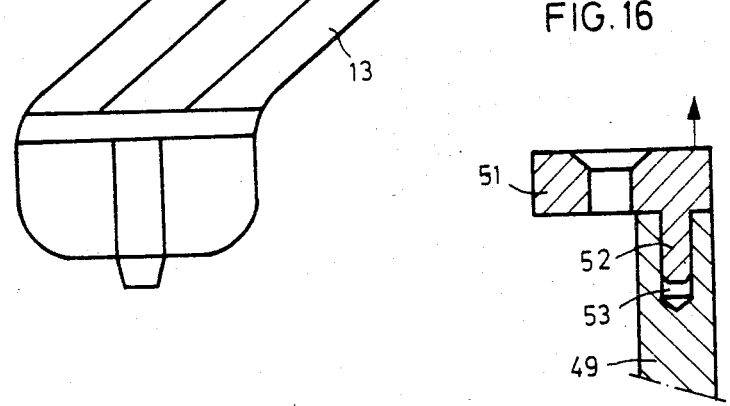
FIG. 16 a section through a detail of FIG. 14.

Finally FIG. 16 shows the replaceable nozzle 51 with its insertion pin 52. Pin 52 is inserted in a corresponding recess 53 of cable guide 49, so that easy interchangeability is possible for different cable shapes and diameters.

The invention is not limited to the represented embodiment. Independent protection is also claimed for claims 21 and 24, because length measuring machines with these features can also be fitted to other means. The Expert can also work out other constructional embodiments within the scope of the claims without being involved in inventive activity.

What is claimed is:

1. An apparatus for spindleless mounting, as well as for cutting and cutting to length and simultaneous measurement of lengths of strands wound on spools arranged in juxtaposed and/or superimposed manner in a supporting frame, wherein the spools can easily be replaced by others of different sizes having outer disks provided with short spindles and wherein the spool bearings of the supporting frame are open at the top for receiving said spindles, said bearings being mounted for movement only in a vertical plane,
   (a) the spool bearings being arranged on horizontal arms, which are in turn mounted on a common crossbar of the supporting frame,
   (b) the horizontal arms being displaceably mounted on the crossbar,
   (c) said crossbar having a many-sided cross-section surrounded by correspondingly many-sided rings, which are fixed to the arms,
   (d) the spool bearings having levers provided with brake shoes and below the bearings, each lever has a pivot bearing which is externally positioned with respect to the spindle bearing and in which is movably mounted a lever, as well as in each case an internally located bearing point on which rests the proportional weight of the spool or reel.

2. An apparatus according to claim 1, wherein the crossbars are arranged on at least two external vertical supports.

3. An apparatus according to claim 2, wherein vertical supports, together with horizontal crossbars form the supporting frame.

4. An apparatus according to claim 3, wherein the supporting frame is provided with rollers at the bottom.

5. An apparatus according to claim 1, wherein between the spindle and the bearing points of the brake shoe levers is provided a seat having at the top a prismatic mounting for the spindle and lower inclined faces for resting on the brake levers.

6. An apparatus according to claim 5, wherein one end of a vertical compression spring is engagingly located at the lower end of the seat and at the bottom rests on the bearing.

7. An apparatus according to claim 5, wherein a vertical stud bolt is screwed into the seat and at the bottom is mounted in the spool bearing with easy movement.

8. An apparatus according to claim 7, wherein an actuating member for the manual adjustment of the braking force is provided at the lower end of the stud bolt.

9. An apparatus according to claim 5, wherein the spool bearing is provided at the bottom with a central spigot for receiving a stud bolt guide and for screwing to a receiving plate welded to the bearing arm.

10. An apparatus according to claim 8, wherein two spool bearings are arranged in juxtaposed manner on a common receiving plate.

11. Apparatus according to claim 1 wherein each of said levers comprises a one-piece L-shaped element, the apex of which is of arcuate shape to fit within the pivot bearing.

* * * * *